Patented Feb. 6, 1940

2,189,529

UNITED STATES PATENT OFFICE 2,189,529

UNSATURATED ETHER PRODUCTS AND PROCESS OF PRODUCING SAME

Wallace H. Carothers and Harry B. Dykstra, Wilmington, Del., assignors to E. I. du Pont de Nemours & Company, Wilmington, Del., a corporation of Delaware No Drawing. Application July 12, 1935, Serial No. 31,092

31 Claims. (Cl. 260—93)

This invention relates to new chemical compounds and their methods of preparation. More particularly it relates to the polymers of these compounds and the methods of their polymerization. Still more particularly it relates to the intermediate products in the process of their production. Still more particularly it relates to their applications.

Many derivatives of butadiene are known. In general it has been found that butadienes having a single activating substituent in the beta position are superior to other derivatives as sources of synthetic rubber. Many possible derivatives have been difficult to prepare, however.

It is an object of this invention to prepare new beta substituted butadienes and to polymerize and apply them. A more specific object is to prepare, polymerize and apply butadienes having an alkoxy or aryloxy substituent in the beta position, i.e., ethers of hydroxy-2-butadiene-1,3. A further object is the preparation of the intermediate products from which these butadienes are obtained. A still further object is to provide a new source of synthetic rubbers. Other objects will appear hereinafter.

These objects are accomplished by preparing compounds having the general formula

and then converting these materials into compounds of the general formula $$CH_2=CH(OR)-CH=CH_2 \text{ (oxyprenes)}$$

by thermal decomposition. These compounds represented by the latter formula wherein R is a hydrocarbon radical are, for simplicity, called "oxyprenes." These oxyprenes have been found to be polymerizable and as disclosed hereinafter the polymerization may be effected under widely varying conditions. The R's in both of the formulae given above are, in fact, hydrocarbon groups and need not be the same. They may be alkyl, aryl, alkaryl or alicyclic hydrocarbon groups.

The reactions and products with which this invention is concerned are first outlined below in terms of a specific example.

1. Methyl ethoxyethyl ketone is converted to the corresponding ketal:

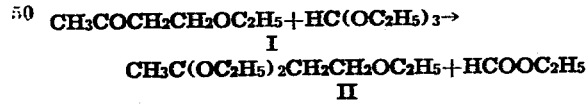

2. The ketal—or trialkoxy butane—is heated,
whereupon it breaks down with the elimination of alcohol yielding the oxyprene:

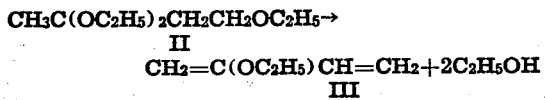

3. At sufficiently high temperatures the dissociation of the ketal (II) to the oxyprene is complete, but at lower temperatures intermediate compounds involving the elimination of only one molecule of alcohol are formed. These are the diethoxybutenes, probably having the formula

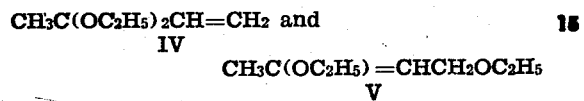

by further heating they are in turn converted to the oxyprene.

4. At lower temperatures any of the compounds III, IV and V, will reunite with alcohol yielding the ketal II. If this alcohol is butyl alcohol and the temperature is adjusted so as to eliminate the ethyl alcohol, the product will be an oxyprene in which the ethyl group (above) has been replaced by butyl. Similarly by the action of phenol, followed by the elimination of ethyl alcohol, a phenoxybutadiene is formed.

5. The oxyprene is polymerized under various conditions. The oxyprene may also be polymerized in admixture with other polymerizable materials yielding a mixed polymer.

$$III \rightarrow \text{polymers (VI)}$$

III+unsaturated compounds→mixed polymers (VII).

The compounds II to VII formulated above each illustrate a class. Generalized formulas are obtained by replacing the $C_2H_5$ groups by R where R is presumed to be any alkyl, aryl, alkaryl, or alicyclic group, and when more than one R group occurs in a formula the different R's need not be the same.

The various classes of reactions and compounds will now be described in more detail under the reaction numbers 1 to 5 used in the condensed description just given.

*Reaction 1.*—In this process a compound of the type $CH_3COCH_2CH_2OR$ (I) is converted to a compound of the type

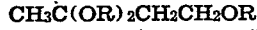

(II). (The R's are not necessarily identical.) The compounds I form no part of the invention and they may be obtained in any desired manner. A convenient method consists in the addition of an alcohol to methyl vinyl ketone as described in copending application of H. S. Rothrock, Serial No. 629,305, filed August 18, 1932, now U. S. Patent No. 2,010,828. A preferred method of bringing about this transformation (formation of II) consists in treating the compound I with an ester of orthoformic acid in the presence of an alcohol and an acidic catalyst, such as a small amount of hydrogen chloride, ammonium chloride, or p-toluene sulfonic acid. It is desirable to use compound I, orthoformic ester, and alcohol in a mol ratio of approximately 1:1:2 (or greater). Other proportions may be used, however. If the R's in the alcohol (ROH) and the orthoformic ester (HC(OR)$_3$) are alike, the R's in the ketal group will be alike; if the R in the alcohol and in the ester are different or if the orthoformate is a mixed ester, a mixture of products containing both simple and mixed ketals will result. The reaction of compounds I with the orthoformates and alcohol takes place at room temperature and is generally complete within a few days. Gentle heating increases the rate of the reaction. The ketal is separated by neutralizing the catalyst and distilling the mixture, preferably under reduced pressure. The procedure is illustrated in the following examples.

EXAMPLE 1

A mixture of 51 grams of β-methoxyethyl methyl ketone (CH$_3$COCH$_2$CH$_2$OCH$_3$), 58 grams of methyl orthoformate (HC(OCH$_3$)$_3$), 51 grams of methyl alcohol, and 0.01 gram of hydrogen chloride was allowed to stand at room temperature for 19 hours and then heated at 50° C. for 30 minutes. The mixture was cooled, made alkaline with ammonium hydroxide, dried over magnesium sulfate, and distilled. This gave 65 grams of the ketal (CH$_3$C(OCH$_3$)$_2$CH$_2$CH$_2$OCH$_3$) which represents a yield of 88 per cent. The product is described in Table I.

Substitutes for orthoformic ester, such as nascent orthoformic or orthoacetic esters (Ber. 40, 3020 (1907)) and orthosilicic esters (Ber. 57, 795 (1924)) may be used in converting compounds I to compounds II but they are in general less satisfactory.

It has been stated that compound I is obtained from methyl vinyl ketone and an alcohol. It is possible to prepare compounds II directly from methyl vinyl ketone by reaction with an orthoformate as illustrated in the following experiment. The general conditions of reaction are similar to those used in carrying out Reaction I, above except that an acid catalyst is preferred. This method is less desirable only for economic reasons.

EXAMPLE 2

A mixture of 42 grams methyl vinyl ketone, 209 grams butyl orthoformate, 133 grams butyl alcohol, and 0.05 gram hydrogen chloride was allowed to stand at room temperature for one week and then heated at 100° C. for 15 minutes. On working up the mixture as in Example I there was obtained 56 grams of the ether-ketal, CH$_3$C(OC$_4$H$_9$)$_2$CH$_2$CH$_2$OC$_4$H$_9$, and 87 grams of the unsaturated ketal or dibutoxybutene, which is believed to have the formula

CH$_3$C(OC$_4$H$_9$)$_2$CH=CH$_2$

These products are described in Tables I and III, respectively.

The compounds of type II which have been prepared are colorless liquids having a faint ethereal odor. They are hydrolyzed in the presence of mineral acids yielding the corresponding compounds I. They may be used as softeners for resins and cellulose derivatives. Physical data for the compounds II are given below in Table I.

TABLE I

| Formula | B. P. °C./mm. | $d_4^{20}$ | $n_D^{20}$ | MR Calcd. | MR Found |
|---|---|---|---|---|---|
| CH$_3$C(OCH$_3$)$_2$CH$_2$CH$_2$OCH$_3$ | 61–63/20 | .9398 | 1.4112 | 39.45 | 39.15 |
| CH$_3$C(OC$_2$H$_5$)$_2$CH$_2$CH$_2$OC$_2$H$_5$ | 75/9 | .8940 | 1.4148 | 53.31 | 53.25 |
| CH$_3$C(OC$_4$H$_9$)$_2$CH$_2$CH$_2$OC$_4$H$_9$ | 120/3 | .8745 | 1.4310 | 81.02 | 81.19 |
| CH$_3$C(OC$_2$H$_5$)(OC$_4$H$_9$)CH$_2$CH$_2$OC$_4$H$_9$ | 152/1 | | 1.5210 | | |

Reaction 2.—The oxyprenes III are formed by the thermal decomposition of the ketals II. The reaction takes place in the absence of a catalyst but is greatly accelerated by the presence of various compounds particularly by those having an acidic reaction. As compounds of this type may be mentioned magnesium sulfate, potassium bisulfate, camphor sulfonic acid, and p-toluene sulfonic acid and similar weakly acidic compounds. Only a very small amount of catalyst is needed, generally from 0.001 per cent to 1.0 per cent on the basis of the ketal. The particular temperature at which decomposition begins is dependent upon the particular ketal and catalyst used. In the case of CH$_3$C(OC$_2$H$_5$)$_2$CH$_2$CH$_2$OC$_2$H$_5$, for example, decomposition begins at about 140° C. when no catalyst is used, at 100° C. when potassium bisulfate is used, and at 65° C. when p-toluene sulfonic acid is used. In general it may be said that the temperature which marks the beginning of the decomposition of any of the ketals II will be found in the range from 50° to 200° C. and, in fact, most of them will be found starting to decompose between 100° and 150° C. These two ranges of temperature include decomposition both in the presence and in the absence of catalysts.

It is desirable to carry out the reaction in such a manner that the decomposition products, i. e., the alcohol and the oxyprene, are removed from the reaction mixture as soon as they are formed. This tends to minimize side reactions, such as the polymerization of the oxyprene. After removing the decomposition products from the reaction system, the alcohol is separated from the oxyprene by a suitable method and the latter is distilled. It is desirable to separate the alcohol because it tends to recombine with the oxyprene. This is readily done in the case of the lower alcohols by washing them out with water. Alcohols which are insoluble in water can be removed by reaction with chemical reagents which are relatively insensitive to the oxyprene. The alcohol and oxyprene may also be separated by low temperature vacuum distillation. As will be shown in the following examples, the oxyprene can be prepared by either a batch or continuous process.

EXAMPLE 3

Twenty grams of $CH_3C(OCH_3)_2CH_2CH_2OCH_3$ and 0.01 gram of d-camphor sulfonic acid were heated in a distilling flask. Decomposition started at 95° C. and proceeded smoothly at 95° to 135° C. until only a gram of viscous residue (probably methoxybutadiene polymer) remained. The decomposition required about one hour. The decomposition products, chiefly methyl alcohol and methoxy-2-butadiene-1,3 (the oxyprene) which distilled off during the decomposition, were collected in water. The water-insoluble portion of the distillate, on drying over potassium carbonate and distilling, gave 7.5 grams methoxybutadiene (66 per cent yield) and 1.5 grams of dimethoxybutene, probably $$CH_3C(OCH_3)_2CH=CH_2$$

EXAMPLE 4

Fifty-five grams of $$CH_3C(OC_2H_5)_2CH_2CH_2OC_2H_5$$

was heated in a distilling flask at 130–200° C. until distillation ceased. This required about three hours. On separating the products as in Example 3, 16 grams of ethoxy-2-butadiene-1,3 was obtained.

EXAMPLE 5

During the course of about four hours the ketal, $CH_3C(OC_2H_5)_2CH_2CH_2OC_2H_5$, was dropped slowly into a heated flask containing 0.01 gram of potassium bisulfate. The ketal was added at such a rate that approximately 20 grams was present in the flask at all times, the flask being heated at 120–140° C. to cause steady distillation of the decomposition products, i. e., ethyl alcohol and ethoxy-2-butadiene-1,3. Some of the intermediate, diethoxybutene, probably diethoxy-2,2-butene-3, also distilled off. The decomposition products were collected in dilute potassium carbonate solution and were worked up by further washing with dilute potassium carbonate solutions followed by drying and distilling. From 126 grams of the ketal there were obtained in this manner 39 grams of ethoxybutadiene (59 per cent conversion) and 12 grams of diethoxybutene (13 per cent conversion). The latter can be returned to the process to yield more ethoxybutadiene.

In general the oxyprenes are liquids having an ethereal odor. Physical properties of representative oxyprenes are given in Table II. The structure $CH_2=C(OR)CH=CH_2$ is assigned to these products on the basis of the following reactions observed for the ethoxy derivative. Ethoxybutadiene is readily hydrolyzed by dilute mineral acids, yielding ethyl alcohol and methyl vinyl ketone. In carbon tetrachloride solution it absorbs four atoms of bromine. It reacts with 1,4-naphthaquinone giving (after oxidation) 2-ethoxyanthraquinone (Diel's diene reaction).

TABLE II

Compounds III—the oxyprenes

| Formula | B. P. °C./mm. | $d_4^{20}$ | $n_D^{20}$ | MR Calcd. | MR Found |
|---|---|---|---|---|---|
| $CH_2=C(OCH_3)CH=CH_2$ | 75/760 | .8281 | 1.4442 | 26.00 | 26.98 |
| $CH_2=C(OC_2H_5)CH=CH_2$ | 96.5/760 | .8153 | 1.4401 | 30.62 | 31.71 |
| $CH_2=C(OC_4H_9)CH=CH_2$ | 65/40 | .8223 | 1.4445 | 39.85 | 40.78 |
| $CH_2=C(OC_6H_5)CH=CH_2$ (probable) | 56/1.5 | 1.0568 | 1.5475 | 45.49 | 43.85 |

Reaction 3.—As indicated in the examples on the preparation of the oxyprenes, an appreciable amount of a dialkoxybutene, believed to have a structure corresponding to the formula $$CH_3C(OR)_2CH=CH_2$$

(IV) is obtained as a by-product. Structurally this compound is believed to be the ketal of methyl vinyl ketone, but to distinguish it from the ketal $CH_3C(OR)_2CH_2CH_2OR$ (II) it will be referred to as a butene derivative, e. g., as diethoxy-2,2-butene-3.

As is apparent from the qualifications put upon them each time they are mentioned both formulae of the two butenes, (IV) and (V) have not been proved so unquestionably that it can be said that they are absolutely certain. The criteria, however, point to these as the correct ones. Moreover, although there may be slight doubt as to the formula it may be stated that two different isomeric butenes are obtained in each case and that these two butenes can be assigned to one or the other of two groups according to their physical and chemical properties. These two groups have been called type (IV) and type (V) above. For convenience hereinafter the fact that the formula assigned to the particular butene is not absolutely certain, will not be noted each time the butene is referred to but it is to be understood that such qualification is intended and that the formula where given is intended to classify the butene with others having like physical and chemical properties so as to distinguish it from its isomer.

The butene IV appears to be formed as an intermediate in the preparation of the oxyprene from the Ketal II. If the decomposition of the ketal is conducted in such a manner that only the oxyprene and the alcohol can escape from the reaction system, compound IV does not appear among the products. The decomposition of IV is catalyzed by acidic materials; a specific illustration is given in subsequent Example 6. The substituted butenes of type IV are readily hydrolyzed by dilute mineral acids, yielding methyl vinyl ketone and alcohol. They are not polymerized appreciably by the addition of iodine. They add alcohols at 100° C. to form ketals of type II. Physical data for various compounds of this class are given in Table III.

When the ketals II are heated in the presence of basic materials, a disubstituted butene (V) is formed which is isomeric with the butene derivatives IV mentioned above. Butenes V yield $CH_3COCH_2CH_2OR$ on hydrolysis and give liquid polymers when treated with iodine. They react slowly with alcohol at 100° C. forming ketals of type II. Oxidation of the ethyl derivative yields ethyl acetate. In view of these reactions, compounds V are assigned the general formula $CH_3C(OR)=CHCH_2OR$. On heating in the presence of acidic compounds they yield the corresponding oxyprenes but the yield is generally poor. Examples of the preparation and decomposition of the substituted butenes of type V are given in subsequent Examples 7 and 8. Members of this class, depending upon their boiling points, may be used as solvents or softeneres in coating compositions, e. g., in lacquers containing cellulose derivatives. Physical data for various members of type V are given in Table III.

EXAMPLE 6

Following the method described in Example 5, 71 grams of $CH_3C(OC_2H_5)_2CH=CH_2$ was decomposed in the presence of about 0.05 gram of potassium bisulfate. Decomposition occurred smoothly at 100–140° C. giving 33 grams of ethoxybutadiene (69 per cent yield) which was separated as in Example 5.

EXAMPLE 7

A mixture of 57 grams of $$CH_3C(OC_2H_5)_2CH_2CH_2OC_2H_5$$

and 0.1 gram aluminum oxide was heated in a distilling flask. Decomposition started at about 110° C. and preceded smoothly at 110–165° C. with the distillation of alcohol and almost no ethoxybutadiene. On distilling the residue in the flask under diminished pressure 41 grams of $CH_3C(OC_2H_5)=CHCH_2OC_2H_5$ was obtained which represents a yield of 95 per cent.

EXAMPLE 8

Twenty-eight grams of $$CH_3C(OC_4H_9)=CHCH_2OC_4H_9$$

and 0.05 gram of magnesium sulfate were heated in a distilling flask at 150–170° C. for one hour. The distillate was freed from butyl alcohol by washing with water and distilled. The products obtained were: 5 grams butoxy-2-butadiene-1,3 (28 per cent conversion), 2 grams $$CH_3C(OC_4H_9)_2CH=CH_2$$

together with 5 grams of recovered $$CH_3C(OC_4H_9)=CHCH_2OC_4H_9$$

*Reaction 4.*—The preparation of oxyprenes from the ketals is a reversible reaction, i. e., compounds III, IV and V reunite with alcohol at temperatures below the dissociation temperature of the ketal. This may be illustrated in equation form as follows:

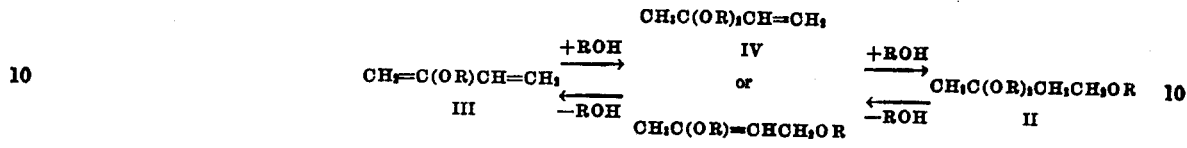

Increase in temperature shifts the equilibrium to the left. The elimination of alcohol from the system also tends to shift the equilibrium to the left.

The R's in the above equation may represent a simple or substituted alkyl, aryl, alkaryl, or alicyclic group. The R's may be alike or different. If, for example, ethoxybutadiene is reacted with butyl alcohol a compound of the formula $$CH_3C(OC_2H_5)(OC_4H_9)CH=CH_2$$

is formed which yields ethyl alcohol and butoxybutadiene on heating to the dissociation temperature. In the decomposition of compounds of type $CH_3C(OR)(OR')CH=CH_2$ the R group having the lower molecular weight is generally removed. This furnishes a method for converting one oxyprene into another. This is the preferred procedure for preparing oxyprenes in which R is a heavy group, e. g., an aryl group.

Compounds III, IV and V also react with polyhydric alcohols, such as glycol, glycerol, cellulose, etc. In the case of compounds III (the oxyprenes) resinous products are generally obtained.

Mercaptans and thiophenols react with compounds III—V in much the same manner as the alcohols and phenols. However, the resulting compounds are more resistant to decomposition than the corresponding oxygen compounds, so that sulfur analogs of the oxyprenes have been obtained only in poor yield.

Specific examples of the reaction of alcohol, phenols, etc. with compounds of types III—V are given below.

EXAMPLE 9

Seven grams of ethyl alcohol and 3.5 grams of ethoxybutadiene was heated in a sealed glass tube at 100° C. for 24 hours and then distilled under 10 mm. pressure. The products consisted chiefly of 4.5 grams ethyl alcohol, 4 grams of the ketal, $CH_3C(OC_2H_5)_2CH_2CH_2OC_2H_5$, and 1 gram of polymerized ethoxybutadiene.

When the above reaction was carried out at 130° C. only a small amount of the triethoxy compound was obtained; the chief product under these conditions was $CH_3C(OC_2H_5)_2CH=CH_2$.

TABLE III

*Compounds IV and V—The substituted butenes*

| Probable formula | B. P. °C./mm. | $d_4^{20}$ | $n_D^{20}$ | MR Calcd. | MR Found |
|---|---|---|---|---|---|
| $CH_3(OCH_3)_2CH=CH_2$ | 98–100/760 | .8756 | 1.4038 | 32.73 | 32.41 |
| $CH_3C(OC_2H_5)_2CH=CH_2$ | 69/100 | .8470 | 1.4062 | 41.96 | 41.82 |
| $CH_3C(OC_2H_5)=CHCH_2OC_2H_5$ | 101/100 | .8711 | 1.4242 | 41.96 | 42.24 |
| $CH_3C(OC_4H_9)_2CH=CH_2$ | 79–80/8 | .8497 | 1.4238 | 60.44 | 60.09 |
| $CH_3C(OC_4H_9)=CHCH_2OC_4H_9$ | 91–93/4 | .8633 | 1.4342 | 60.44 | 60.42 |
| $CH_3C(OC_2H_5)(OC_6H_5)CH=CH_2$ | 82/3 | 1.0345 | 1.5128 | 56.83 | 55.79 |
| $CH_3C(OC_6H_5)=CHCH_2OC_6H_5$ | 142/1 | | 1.5380 | | |

EXAMPLE 10

A mixture of 8 grams of ethyl alcohol and 4 grams of $CH_3C(OC_2H_5)_2CH=CH_2$ was heated at 100° C. for 20 hours. On distillation there was obtained in addition to recovered reactants, 2.5 grams of $CH_3C(OC_2H_5)_2CH_2CH_2OC_2H_5$.

EXAMPLE 11

A mixture of 15 grams of ethoxy-2-butadiene-1,3, 11 grams of butyl alcohol, and 0.1 gram of magnesium sulfate was distilled at atmospheric pressure until the distillation temperature reached 95° C. and then the pressure was reduced to 18–100 mm. The products isolated were: 2 grams of ethyl alcohol, 6 grams of ethoxybutadiene, 2 grams of butyl alcohol, 6 grams of dibutoxybutene (presumably $$CH_2=CHC(OC_4H_9)_2CH_3$$

and 6 grams of an unidentified residue. The dibutoxybutene (B. P. 79°–81° C./8 mm.) decomposed when heated with a trace of potassium bisulfate to give butyl alcohol and butoxy-2-butadiene-1,3 in good yield.

EXAMPLE 12

A mixture of 14 grams ethoxybutadiene and 40 grams of abietyl alcohol was heated at 100° C. for 22 hours. A small amount of potassium acid sulfate was added and the mixture heated at 100–200° C. until the distillation of ethyl alcohol (4 grams) and unreacted ethoxybutadiene (5 grams) ceased. The residue was then heated under 1 mm. pressure until the unreacted abietyl alcohol (22 grams) distilled over. The product which did not distill was abietoxybutadiene, $$CH_2=C(OC_{20}H_{31})CH=CH_2,$$

and its polymer. It resembled ester gum in general appearance and softened at about 110° C. It was insoluble in alcohol and acetone but soluble in benzene and kerosene. It gave rapidly drying films similar to those obtained from ester gum.

EXAMPLE 13

A mixture of 15 grams of ethoxy-2-butadiene-1,3 and 14 grams of phenol reacted exothermically at room temperature. When the reaction subsided, the mixture was heated at 110° C. for five hours. Distillation of the reaction products gave 3 grams of phenol, 17 grams of ethoxyphenoxybutene (presumably $$CH_2=CHC(OC_2H_5)(OC_6H_5)CH_3$$

boiling at 82° C./3 mm., 6 grams of liquid boiling at 150°–162° C./3 mm., and a small amount of viscous residue. On heating 10 grams of the ethoxyphenoxybutene at 150°–225° C. in the presence of 0.01 gram of potassium bisulfate, it decomposed giving ethyl alcohol and 5 grams of phenoxybutadiene, B. P. 71°–74° C./3 mm.

EXAMPLE 14

A mixture of 14.7 grams of ethoxybutadiene and 12.4 grams of ethylene glycol was heated in a sealed tube for 24 hours at 110° C. On distilling the homogeneous reaction mixture there was obtained 9 grams of ethyl alcohol, 12 grams of a compound boiling at 56° C./100 mm., and 5 grams of resinous product. The compound boiling at 56° C./100 mm. analyzed correctly for $C_6H_{10}O_2$; its properties suggest that it is either a $\beta$-substituted butadiene $$(CH_2=CHC(OCH_2CH_2OH)=CH_2)$$

or a cyclic ketal

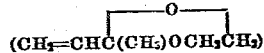

Glycerol gave chiefly resinous products when heated with ethoxybutadiene at 110–130° C.

EXAMPLE 15

Thirty grams of ethoxybutadiene was added to 33 grams of thiophenol. A mild exothermic reaction took place. On heating the mixture at 100° C. for 1.5 hours and distilling there was obtained 52 grams of a monoaddition product $C_{12}H_{16}OS$ boiling largely at 103–106° C./1 mm. and 7 grams of higher boiling product, probably containing some $C_{18}H_{22}OS_2$. On heating the monoaddition product at 200–260° C. in the presence of potassium acid sulfate, a small amount of ethyl alcohol and a product boiling at 62–65° C./2 mm. were obtained. Analysis indicated that the latter product was $C_{10}H_{10}S$, probably the oxyprene analog $CH_2=C(SC_6H_5)CH=CH_2$. Other properties observed for this product are $$d_4^{20}\ 1.010;\ n_D^{20}\ 1.5572;\ M_R\ \text{calcd.}$$

for formula indicated, 51.82; $M_R$ found, 51.75. The product showed no tendency to polymerize on exposure to air.

*Reaction 5.*—The oxyprenes polymerize slowly on standing, giving resinous or rubber-like products depending upon the oxyprene. Ethoxybutadiene, for example, yields a synthetic rubber, whereas phenoxybutadiene yields a resin. The polymerization of oxyprenes is accelerated by light, heat, and various catalysts, such as air, ozone, inorganic peroxides, perborates, organic peroxides, aldehydes, alkali metals, iodine, metallic halides, metallo-organic compounds, and various acids, including hydrogen cyanide and acetic acid. In general three types of polymers can be obtained; namely, liquids, resins, and rubber-like products. Use of low temperatures and absence of diluents and catalysts favor the formation of rubber-like polymers. Elevated temperature promotes the formation of liquid polymers. Certain catalysts, notably iodine and hydrogen cyanide, bring about the formation of liquid oxyprene polymers which contain a preponderance of dimer.

The oxyprenes can be polymerized in the presence of other compounds, e. g., solvents, plasticizers, resins, oils, rubber, cellulose derivatives, pigments, etc. This often leads to the formation of a more intimate and compatible mixture than can be secured by simply mixing the polymerized oxyprene with these materials. Oxyprenes may also be polymerized in the presence of other polymerizable materials, e. g., vinyl ethers; vinyl esters; hydrocarbon dienes including butadiene, isoprene; styrene; drying oils; acrylic acid derivatives; methacrylic acid derivatives, such as methacrylic nitrile and methyl methacrylate; etc. Products prepared in this way are generally interpolymers and differ in properties from mechanical mixtures of the polymers prepared separately.

Specific examples of the polymerization of oxyprenes and applications of the polymers are given below.

EXAMPLE 16

Forty grams of ethoxy-2-butadiene-1,3 was heated in a sealed glass tube at 130° C. for 13 days. Substantially complete polymerization occurred, the product consisting of about equal amounts of dimer (B. P. 105°–125° C./5 mm.) and solid polymer. The latter was a light colored, soft, sticky, elastic resin soluble in acetone, ethyl acetate, and benzene, but insoluble in water, ligroin and alcohol.

Similar polymers were obtained using small amounts of benzoyl peroxide as a catalyst.

EXAMPLE 17

Approximately 1 cc. of a 2 per cent solution of iodine in chloroform was added to 10 grams of ethoxy-2-butadiene-1,3. Rapid polymerization occurred with the development of considerable heat. Distillation of the mixture after three days showed that 30 per cent of the ethoxybutadiene had polymerized. About 65 per cent of the polymer consisted of liquid dimer and trimer while the remainder was semi-resinous in character.

EXAMPLE 18

Approximately 0.1 gram sodium was added to 3 grams ethoxybutadiene. After four days the ethoxybutadiene gelled; after 18 days, treatment of the gel with methyl alcohol gave a methyl alcohol-insoluble, rubber-like ethoxybutadiene polymer.

EXAMPLE 19

A few drops of a 25 per cent solution of stannic chloride in benzene was added to 5 grams ethoxybutadiene. A vigorous reaction occurred converting the ethoxybutadiene into a dark viscous mass within a few minutes. This product was dissolved in benzene and precipitated by pouring into methyl alcohol. The precipitate (4 grams) was a brown resinous polymer of ethoxybutadiene. It was brittle while cold but softened on slight warming.

Acetic acid also converts ethoxybutadiene into a brittle resinous product but the reaction is less violent and the product is light colored.

EXAMPLE 20

On exposing a quartz tube containing butoxy-2-butadiene-1,3 to ultraviolet light for one week, a 13 per cent yield of polymer was obtained. The polymer was a white, opaque, fibrous solid which was somewhat sticky and elastic. It was insoluble in alcohol, acetone, and ethyl acetate. In chloroform and benzene it lost its opacity but did not dissolve.

EXAMPLE 21

A small amount of phenoxybutadiene was poured on a glass plate and exposed to air at 20°–30° C. Within two hours the phenoxybutadiene set to a sticky film. The film became tack-free in two days and was hard and tough at the end of a week.

This example shows that phenoxybutadiene has the properties of a drying oil. As in the case of drying oils the transformation of phenoxybutadiene from a liquid to a hard film is hastened by a variety of compounds including oxidizing agents, such as benzoyl peroxide, and metallic driers of the types used with drying oils. The properties of the film may be altered by adding substances, such as resins, drying oils, softeners, pigments, cellulose derivatives, etc.

EXAMPLE 22

A lacquer composition was made of the following ingredients:

| | Parts by weight |
|---|---|
| Nitrocellulose (½ second) | 10 |
| Dibutoxy-1,3-butene-2 | 3 |
| Ethyl alcohol | 8 |
| Ester solvents | 20 |
| Aromatic hydrocarbons | 10 |

Films prepared from this lacquer were rapid, drying, clear, and flexible. The butenyl ether functioned as a softener.

EXAMPLE 23

A lacquer of the following composition gave clear films which became tack-free in one-half hour and hard (but flexible) in one hour.

| | Parts by weight |
|---|---|
| Resinous thermal polymer of ethoxybutadiene | 10 |
| Nitrocellulose (½ second) | 10 |
| Ethyl acetate | 100 |
| Butyl acetate | 30 |

EXAMPLE 24

A varnish of the following composition gave clear films which became tack-free in three hours and hard in 18 hours. The films were smooth and tough.

| | Parts by weight |
|---|---|
| Thermal polymer of ethoxybutadiene | 10 |
| Heat treated China-wood oil | 10 |
| Ethyl acetate | 70 |
| Toluene (containing cobalt drier) | 60 |

EXAMPLE 25

Films made from a lacquer of the following composition dried well and were hard, tough and flexible.

| | Parts by weight |
|---|---|
| Phenoxybutadiene | 10 |
| Ethyl cellulose | 10 |
| Toluene | 30 |
| Ethyl alcohol | 10 |

EXAMPLE 26

A varnish was made of equal parts of oil modified polyhydric alcohol-polybasic acid resin, phenoxybutadiene and toluene. Films prepared from the varnish were hard and tough after a few days' drying.

EXAMPLE 27

Films of a varnish of the following composition dried within a few days to form hard, tough coatings.

| | Parts by weight |
|---|---|
| Phenoxybutadiene | 30 |
| Linseed oil | 10 |
| Drier containing 2% cobalt | 0.3 |

This invention provides methods for securing useful compounds which have never been prepared previously. It furnishes a means for obtaining a new type of polymerizable material that can be made to give polymers varying in properties from liquids to resins or rubber-like products. The polymers have the advantage of being neutral, non-corrosive, and resistant to alkaline reagents. They do not develop acidity on aging. The products of this invention, depending upon their properties, may be used for a variety of purposes: for example, as ingredients in coating compositions either as solvent, plasticizer, or resin; in plastic compositions; in adhesives; and in impregnating compositions. Moreover, the products may be modified to suit certain applications by hydrogenation, hydrolysis, halogenation, etc.

It is apparent that many widely different embodiments of this invention may be made without departing from the spirit and scope thereof and, therefore, it is not intended to be limited except as indicated in the appended claims.

We claim:

1. As a new product a compound of the general formula

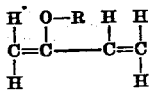

in which R is a hydrocarbon radical.

2. As a new product a compound of the general formula

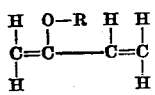

in which R is an open chain hydrocarbon radical.

3. The process which comprises heating to a temperature between about 50° C. and about 200° C. a compound of the general formula

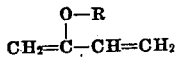

in which R is a hydrocarbon radical with a compound of the formula

in which $R_1$ is a hydrocarbon radical of higher molecular weight than R, then separating a compound of the general formula

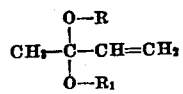

and decomposing the compound so obtained in such a way that one of the products of the decomposition is a compound of the group consisting of alcohols and phenols by heating the said compound to a temperature of about 50° C. to about 200° C.

4. A polymer of a compound of the general formula

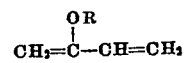

in which R is a hydrocarbon radical.

5. The process which comprises polymerizing a compound of the general formula

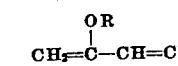

in which R is a hydrocarbon radical.

6. A coating composition comprising a substantial amount of a polymer as described in claim 4 and a solvent therefor.

7. In a process which involves decomposing a compound of the general formula

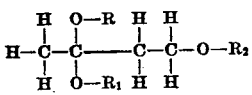

in which R, $R_1$, and $R_2$ are hydrocarbon radicals in such a way that one of the products of the decomposition is a compound of the group consisting of alcohols and phenols, the step which comprises heating the compound of the general formula to a temperature of about 50° C. to about 200° C. in the presence of a weakly acidic decomposition catalyst.

8. A product as described in claim 1 further characterized in that R is a low molecular weight hydrocarbon radical.

9. A product as described in claim 1 further characterized in that R is a saturated open chain aliphatic hydrocarbon radical.

10. A product as described in claim 1 further characterized in that R is an aryl hydrocarbon radical.

11. Methoxy-2-butadiene-1,3.

12. Ethoxy-2-butadiene-1,3.

13. Phenoxy-2-butadiene-1,3.

14. A coating composition comprising a substantial amount of a polymer as described in claim 4 and an organic film-forming material compatible therewith.

15. A coherent film obtained from a composition comprising a compound as described in claim 13 by spreading the composition in a thin film and allowing it to dry.

16. A coherent film obtained from a composition comprising a polymer as described in claim 4 by spreading the composition in a thin film and allowing it to dry.

17. In a process which involves decomposing a compound of the general formula

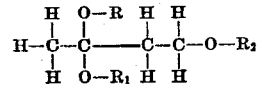

in which R, $R_1$, and $R_2$ are hydrocarbon radicals, in such a way that one of the products of the decomposition is a compound of the group consisting of alcohols and phenols, the step which comprises heating the compound of the general formula to a temperature of about 50° C. to about 200° C.

18. The process of claim 17 further characterized in that the products of the decomposition are removed from the zone of reaction as they are formed.

19. In a process for preparing a compound of the general formula

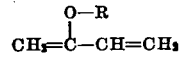

in which R is a hydrocarbon radical, the step which comprises heating a butane of the general formula

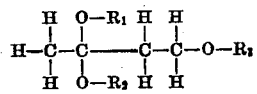

in which $R_1$, $R_2$, and $R_3$ are hydrocarbon radicals, in the presence of a weakly acidic decomposition catalyst at a temperature of about 50° C. to about 200° C.

20. The process of claim 19 further characterized in that the butane is heated in a still and in that the decomposition products are distilled over and collected and in that the compound of the general formula

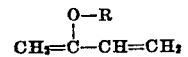

is separated from said distillate.

21. The process of claim 7 further characterized in that the weakly acidic decomposition catalyst is potassium acid sulfate and in that the compound of the general formula is heated at a temperature of about 100° C. to about 150° C.

22. The process of claim 7 further characterized in that R, R₁, and R₂ in the general formula are ethyl groups, and in that the weakly acidic decomposition catalyst is a member of the group consisting of magnesium sulfate, potassium bisulfate, camphor sulfonic acid, and p-toluene sulfonic acid.

23. In a process which involves decomposing a compound of the general formula

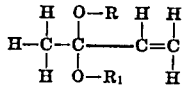

in which R and R₁ are hydrocarbon radicals, in such a way that one of the products of the decomposition is a compound of the group consisting of alcohols and phenols, the step which comprises heating the compound of the general formula to a temperature of about 50° C. to about 200° C. in the presence of a weakly acidic decomposition catalyst.

24. In a process which involves decomposing a compound of the general formula

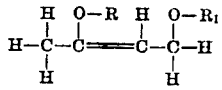

in which R and R₁ are hydrocarbon radicals, in such a way that one of the products of the decomposition is a compound of the group consisting of alcohols and phenols, the step which comprises heating the compound of the general formula to a temperature of about 50° C. to about 200° C. in the presence of a weakly acidic decomposition catalyst.

25. A polymer as described in claim 4 further characterized in that R in the general formula is an open chain hydrocarbon radical.

26. A polymer as described in claim 4 further characterized in that R in the general formula is a low molecular weight hydrocarbon radical.

27. A polymer as described in claim 4 further characterized in that R in the general formula is a saturated open chain aliphatic hydrocarbon radical.

28. A polymer as described in claim 4 further characterized in that R in the general formula is an aryl hydrocarbon radical.

29. In a process which involves adding to a compound of the general formula

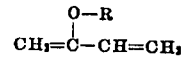

a compound of the general formula R₁ (A—H)$_y$, in which A is a member of the group consisting of oxygen and sulfur, H is hydrogen, $y$ is a whole number less than four, and R and R₁ are hydrocarbon radicals, the step which comprises bringing the two compounds together and heating them above their reaction temperature but below the temperature at which the addition compound dissociates.

30. A product obtained by polymerizing a compound of the general formula

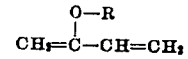

in which R is a hydrocarbon radical, in the presence of a polymerizable organic compound containing an olefinic linkage selected from the group consisting of vinyl esters, vinyl ethers, hydrocarbon dienes, drying oils, esters of acrylic acid, and esters of methacrylic acid.

31. The process of claim 19 further characterized in that the weakly acidic decomposition catalyst is selected from the group consisting of magnesium sulfate, potassium bisulfate, camphor sulfonic acid, and p-toluene sulfonic acid.

WALLACE H. CAROTHERS.
HARRY B. DYKSTRA.